United States Patent [19]

Adelmann et al.

[11] 4,230,548

[45] Oct. 28, 1980

[54] POLYCARBONATES WITH END GROUPS CONTAINING BONDS WHICH CAN BE CROSSLINKED BY UV LIGHT

[75] Inventors: Siegfried Adelmann; Dieter Margotte; Hugo Vernaleken, all of Krefeld, Fed. Rep. of Germany

[73] Assignee: Bayer Aktiengesellschaft, Leverkusen, Fed. Rep. of Germany

[21] Appl. No.: 34,839

[22] Filed: Apr. 30, 1979

Related U.S. Application Data

[63] Continuation of Ser. No. 945,152, Sep. 22, 1978, abandoned.

[30] Foreign Application Priority Data

Oct. 13, 1977 [DE] Fed. Rep. of Germany ....... 2746139
Jul. 4, 1978 [DE] Fed. Rep. of Germany ....... 2829258

[51] Int. Cl.$^3$ .......................... C08G 63/62; C08J 3/28
[52] U.S. Cl. .......................... 204/159.14; 204/159.18; 528/196; 528/205
[58] Field of Search ....................... 528/196, 202, 205; 204/159.14, 159.18, 159.19

[56] References Cited

U.S. PATENT DOCUMENTS

| | | | |
|---|---|---|---|
| 2,838,474 | 6/1958 | Meis et al. | 528/205 |
| 3,124,555 | 3/1964 | Bown et al. | 528/205 X |
| 3,150,066 | 9/1964 | Schnell et al. | 204/159.19 |
| 3,453,237 | 7/1969 | Borden et al. | 260/30.4 |
| 3,475,373 | 10/1969 | Jackson et al. | 260/47 |
| 3,518,175 | 6/1970 | Bell | 204/159.19 |
| 3,600,288 | 8/1971 | Viventi | 204/159.13 |
| 3,622,331 | 11/1971 | Thomas | 430/156 |
| 3,775,367 | 11/1973 | Nouvertne | 260/45.9 R |
| 3,787,302 | 1/1974 | Ijichi et al. | 204/159.2 |
| 3,789,052 | 1/1974 | Klebe et al. | 260/470 Z |
| 3,892,889 | 7/1975 | Cohnen et al. | 427/160 |
| 3,912,687 | 10/1975 | Haupt et al. | 528/202 |
| 3,992,276 | 11/1976 | Powanda et al. | 204/159.16 |
| 4,101,399 | 7/1978 | Costanza et al. | 204/159.19 |
| 4,129,612 | 12/1978 | Serini et al. | 260/860 |

FOREIGN PATENT DOCUMENTS

| | | |
|---|---|---|
| 1085668 | 7/1960 | Fed. Rep. of Germany . |
| 1099732 | 8/1961 | Fed. Rep. of Germany . |
| 1930257 | 12/1970 | Fed. Rep. of Germany . |
| 2211641 | 9/1973 | Fed. Rep. of Germany . |
| 2401630 | 8/1974 | Fed. Rep. of Germany . |
| 2408068 | 8/1975 | Fed. Rep. of Germany . |
| 1397919 | 6/1975 | United Kingdom . |

*Primary Examiner*—Wilbert J. Briggs, Sr.
*Attorney, Agent, or Firm*—Gene Harsh; Lawrence S. Pope

[57] ABSTRACT

The present invention relates to high-molecular weight aromatic polycarbonates, based on diphenols and monofunctional chain stoppers, corresponding to the formula (I)

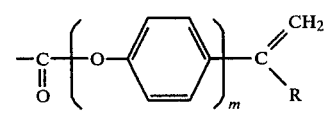

in which
Z denotes the radical of a diphenol,
n denotes an integer from about 20 to 400,
E denotes

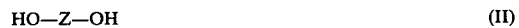

wherein
m denotes 0 or 1 and
R denotes H or $C_1$-$C_3$-alkyl.

The present invention also relates to a process for the preparation of the polycarbonates of the formula (I) comprising reacting diphenols of the formula (II)

$$HO-Z-OH \qquad (II)$$

wherein
Z is a divalent aromatic radical, and/or their chlorocarbonic acid esters in accordance with the processes which are known for the preparation of polycarbonates, in a homogeneous or heterogeneous phase system, with compounds of the formula (III)

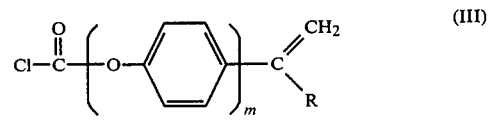

wherein
m denotes 0 or 1 and
R denotes H or $C_1$-$C_3$-alkyl.

The present invention also relates to a process for cross-linking the polycarbonates of the formula (I) with UV light, after adding a photoinitiator and, optionally, flameproofing and photo-reducing agents. Finally, the present invention relates to the cross-linked polycarbonates obtained via this process.

18 Claims, No Drawings

POLYCARBONATES WITH END GROUPS CONTAINING BONDS WHICH CAN BE CROSSLINKED BY UV LIGHT

This is a continuation of application Ser. No. 945,152 filed Sept. 22, 1978, now abandoned.

BACKGROUND OF THE INVENTION

Polycarbonates are known and, because of their outstanding properties, have found use in many fields of application. However, their resistance to organic solvents and to stress cracking, for example, is inadequate for specific applications.

Compared with the polycarbonates which are customarily terminated only with phenol, p-tert.-butylphenol of 2,6-dimethylphenol, the polycarbonates according to the invention show no deviations in their mechanical or thermal properties. In addition, they are suitable for crosslinking, in particular, in the presence of photoinitiators and under irradiation with UV light, and thus are resistant to organic solvents, insensitive to stress cracking, and make it possible to prepare polycarbonates with particularly good flame-repellant properties by adding flameproofing agents.

SUMMARY OF THE INVENTION

The present invention relates to new high-molecular weight crosslinkable polycarbonates having molecular weights $\overline{M}_w$ (weight-average) between about 10,000 and 200,000, preferably between about 20,000 and 80,000, which are based on diphenols and monofunctional chain stoppers, characterized in that they correspond to the formula (I)

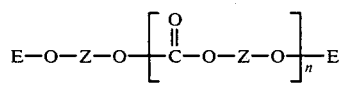

in which
Z is the radical of a diphenol,
n is an integer from about 20 to 400 and
E is

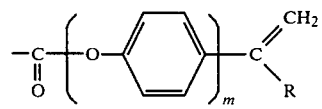

wherein
m denotes 0 or 1 and
R denotes H or $C_1$-$C_3$-alkyl.

The present invention also relates to a process for the preparation of new high-molecular polycarbonates having a $\overline{M}_w$ (weight-average) of between about 10,000 and 200,000, preferably between about 20,000 and 80,000, which is characterized in that diphenols of the formula (II)

$$HO-Z-OH \qquad (II)$$

wherein
Z is a divalent aromatic radical which can be optionally alkyl-substituted or halogen-substituted and which preferably contains about 6 to 30 C atoms, and/or their chlorocarbonic acid esters are reacted in accordance with the processes which are known for the preparation of polycarbonates, in a homogeneous or heterogeneous phase system, with between about 0.05 and 5 mol %, preferably between about 0.1 and 4 mol %, relative to mols of structural units Z employed, of compounds of the formula (III)

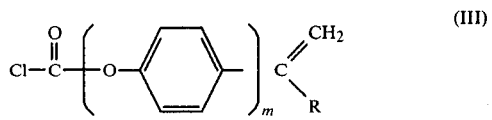

wherein
m and R have the meaning indicated for formula (I).

The present invention also relates to a process for the modification of polycarbonates, which is characterized in that the polycarbonates or polycarbonate mixtures of the formula (I) according to the invention are irradiated with UV light, after adding about 0.5 to 5% by weight, preferably about 1 to 3% by weight, relative to the weight of polycarbonate, of a photoinitiator and optionally between about 0.5 to 5% by weight, preferably between about 1 and 3% by weight, relative to the weight of polycarbonate, of a photo-reducing agent, and optionally, between about 0.05 and 5% by weight, preferably between about 0.1 and 2% by weight, relative to the weight of polycarbonate, of a flameproofing agent.

The present invention also relates to the crosslinked polycarbonates obtained by the above-mentioned process.

DETAILED DESCRIPTION OF THE INVENTION

The monomers employed for chain-stopping are inexpensive and readily available on the market and can be incorporated without difficulty into the polymer by the processes which are known for the preparation of polycarbonates, so that polycarbonates which can be easily crosslinked by UV light can be prepared under economical conditions.

Examples of compounds of the formula (III) which are suitable according to the invention are: acryloyl chloride, methacryloyl chloride, isopropenylphenyl chlorocarbonate, and p-hydroxystyrene chlorocarbonate.

In addition to the chain stoppers accordng to the formula (III) to be used according to the invention, all the customary monofunctional phenols which are suitable for the synthesis of polycarbonates can also be co-used according to the invention.

Examples of suitable diphenols of the formula (II) which preferably contain 6 to 30 C atoms are: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) sulphoxides, bis-(hydroxyphenyl) sulphones, α,α'-bis-(hydroxyphenyl)-diisopropylbenzenes and nuclear-alkylated and nuclear-halogenated compounds thereof.

These and other suitable diphenols are described, for example, in U.S. Pat. Nos. 3,028,365, 2,999,835, 3,148,172, 3,271,368, 2,991,273, 3,271,367, 3,280,078, 3,014,891 and 2,999,846; in German Published Patent Specifications Nos. 1,570,703, 2,063,050, 2,063,052, 2,211,956 and 2,211,957; French Patent Nos. 1,561,518 and in the monograph "H. Schnell, Chemistry and Physics of Polycarbonates, Interscience Publishers, New York, 1964".

Examples of preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

It is also possible to use any desired mixtures of the diphenols of the formula (II).

The polycarbonates can be branched by incorporating small amounts, preferably amounts between about 0.05 and 2.0 mol %, relative to diphenols incorporated, of compounds which are trifunctional or more than trifunctional, in particular those with three or more than three phenolic hydroxyl groups.

Polycarbonates of this type are described, for example, in German Published Patent Specifications Nos. 1,570,533, 1,595,762, 2,116,974, 2,113,347 and 2,500,092; British Patent Nos. 1,079,821; and U.S. Pat. No. 3,544,514.

The preparation of the polycarbonates according to the invention can essentially be carried out by the following two known processes (compare H. Schnell, Chemistry and Physics of Polycarbonates, Polymer Rev., Volume IX, page 27 et seq., Interscience Publishers), which are briefly described below:

1. Preparation of an aromatic polycarbonate in a heterogeneous phase system (phase boundary process)

In this process, the diphenols of the formula (II) are dissolved in an aqueous alkaline phase. The chain regulators according to formula (III) required for the preparation of the polycarbonates according to the invention are added to this alkaline phase, dissolved in an organic solvent or in bulk. After adding a solvent suitable for the polycarbonate, a two-phase mixture forms, into which phosgene is passed between about 0° and 60° C. After adding a catalyst, high-molecular weight polycarbonates are obtained. The mixture is worked up by washing the organic phase and then distilling off the solvent, for example in devolatilization extruders at temperatures of between about 280° and 330° C.

Suitable organic solvents for polycarbonates and for the compounds of the formula (III) are those which are known for the synthesis of polycarbonates, such as, for example, methylene chloride, chlorobenzene and mixtures thereof.

Suitable catalysts are those which are known for the synthesis of polycarbonates, such as, for example, triethylamine and tributylamine.

2. Preparation of a polycarbonate in a homogeneous phase system (pyridine process)

The diphenols according to the general formula (II) and the chain regulators according to the general formula (III) are dissolved in an organic base, such as, for example, pyridine. After adding a solvent suitable for the polycarbonate, phosgene is passed in at temperatures between about 0° and 60° C.

The pyridine hydrochloride which forms during the reaction is filtered off and the organic phase is washed with dilute HCl and then with water until neutral. Working up is also carried out as described under 1), for example by evaporating off the solvent in a devolatilization screw.

In addition to pyridine, examples of suitable organic bases are triethylamine and tributylamine. Methylene chloride and chlorobenzene and mixtures thereof can be used as solvents for the polycarbonate.

If in addition to or instead of the diphenols of the formula (II) their chlorocarbonic acid esters are employed, the amounts of chain stoppers necessary for the processes under (1) and (2) are accordingly calculated from the structural units Z resulting from the sum of the bisphenols of the formula (II) and their chlorocarbonic acid esters.

In principle, all photoinitiators which are compatible with polycarbonates are suitable for the modification of the polycarbonates according to the invention. Thus, for example, photoinitiators based on aliphatic and aromatic ketones in the broadest sense including glyoxalates and quinones are suitable. Examples of ketones in the narrower sense and glyoxalates are acetophenone,-benzil, benzoin, benzoin methyl ether, benzoin isopropyl ether, benzophenone, p-chlorobenzophenone, p-benzoylbenzophenone, dibenzalacetone, benzoylacetone, benzylacetone, deoxybenzoin, 2,4-dimethylbenzophenone, 2,5-dimethylbenzophenone, 3,4-dimethylbenzophenone, 4-benzoyldiphenyl, 9-fluorenone, 4,4-bis-(dimethylamino)-benzophenone, 4-dimethylamino-benzophenone, dibenzyl ketone, 4-methylbenzophenone, propiophenone, benzanthrone, ethylphenyl glyoxalate, tert.-butylphenyl glyoxalate, trimethylsilylphenyl glyoxalate and others.

The aromatic ketones or glyoxalates are preferred. Benzophenone, benzoin, p-benzoylbenzophenone, tert.-butylphenyl glyoxalate and trimethylsilylphenyl glyoxalate are particularly preferred.

Quinones can also be used as the photoinitiators, for example: anthraquinone, 1-chloroanthraquinone, 2-chloroanthraquinone, 2-ethylanthraquinone, 1-methylanthraquinone, 2-methylanthraquinone, 2-phenylanthraquinone and others. Preferred quinones are 2-methylanthraquinone, 2-chloroanthraquinone and 2-ethylanthraquinone.

Other suitable photoinitiators are known to the expert and can be seen from the following publications: J. Kosar, "Light-Sensitive Systems", John Wiley & Sons, New York, 1965, Chapters 4 ("Unsaturated Compounds"), 5 ("Photopolymerization Processes") and 8 (Photopolymerization of Vinyl Monomers), "Chem. Revs." 68, 125–151 (1968); J. F. Rabek "Photosensitized Processes in Polymer Chemistry: A Review", Photochem. Photobiol. 7, 5–57, (1968); G. Delzenne, "Sensitizers of Photopolymerization", Ind. Chim. Belge 24, 739–764 (1959); and C. M. McCloskey and J. Bond, "Photosensitizers for Polyester-vinyl Polymerization", Ind. Eng. Chem. 47, 2125–2129 (1955).

The UV irradiation required for the modification of the polycarbonates according to the invention is effected with UV light using commercially available UV lamps, for example Philips HTQ 4 or 7, Hanovia lamps and others. The irradiation time is about 20 to 180 seconds, depending on the content of photoinitiators employed and the nature of the sample.

Examples of flameproofing agents which are suitable for the modification of the polycarbonates according to the invention are the compounds which are known and suitable for rendering polycarbonates flame-resistant, and substances having a synergistic action, such as are described in German Published Patent Specifications Nos. 2,049,358 and 2,253,072; U.S. Pat. Nos. 3,775,367 and 3,836,490; and other literature sources.

Examples of suitable compounds are alkali metal salts, in particular those which are soluble in polycarbonate, such as, for example, potassium isooctanate, sodium isooctanate, lithium isooctanate, potassium perfluorooctanate, sodium perfluorooctanate, lithium perfluorooctanate, potassium salts of 5-ethyl-dioxan-1,3-yl-5-carboxylic acid, rubidium isooctanate, rubidium perfluorooctanate and the alkali metal salts of perfluoroalkanesulphonic acid, such as potassium perfluoromethanesulphonate, potassium perfluorooctanesulphonate and potassium perfluorobutanesulphonate.

Furthermore, alkali metal salts of lauric acid, stearic acid, oleic acid, phthalic acid monobenzyl ester, adipic acid monobutyl ester, p-octylbenzoic acid, p-tert.-butylbenzoic acid, 3-(3,5-di-tert.-butyl-4-hydroxyphenyl)-propionic acid and diglycollic acid monodecyl ester can be used.

The modification of the polycarbonates according to the invention may be effected in two stages. The first stage is the incorporation of the photoinitiator and optionally a flameproofing agent and/or photo-reducing agent via (a) dissolving and isolating as a film, or via
(b) compounding between about 280° and 330° C. and optionally molding the polycarbonate into sheets or other injection-molded parts, and the second stage is the UV irradiation until crosslinking is effected.

In the case of processing variable (b) it is preferred to add substances such as, for example, benzophenone to the polycarbonate before compounding to activate the photoinitiator. The use of a photo-reducing agent with a photoinitiator is well known in the literature. (Compare J. Am. Chem. Soc. 83, 2795 (1961), J. Am. Chem. Soc. 89, 3471 (1967) and Angew. Chem. 1032 (1972)).

Suitable substances are compounds with unstable CH-bonds such as e.g. mesitylene, dibenzylether, benzoic acid benzylester and others. Polymers with unstable CH-bonds are also suited for the activation, for example, polyglycolether, aliphatic polyester and other compounds.

An alternative possibility for activating the photoinitiators for the modification of the inventive polycarbonates according to processing variable (b) consists in exposing the photoinitiator-containing polycarbonates prior to irradiation to vapors of organic compounds with unstable CH-bonds and immediately thereafter performing the crosslinking via UV irradiation.

The organic compounds under consideration here are for example tetrahydrofurane, dioxane, chloroform, toluene, xylene, $CH_2Cl_2$ and similar compounds.

The amount of photo-reducing agent to be incorporated depends on the amount of the incorporated photoinitiator but generally equimolar amounts, based upon the photoinitiator, of photo-reducing agents are added.

Furthermore, depending on the amount of the incorporated photoinitiator, the amount of the photo-reducing agent utilized in vapor form depends mainly on the surface to be crosslinked and the structure of the polycarbonate molded part as well as the intensity of the desired crosslinking reaction.

An alternative procedure for providing the inventive polycarbonates, optionally after the incorporation of flame retardants, with photoinitiators and optionally with photo-reducing agents, is dipping or spraying the respective polycarbonate molded parts by well-known processes e.g. analogous to the process of U.S. Pat. No. 3,892,889, using solutions of the photoinitiators and optionally the photo-reducing agents in solvents that are inert toward polycarbonate.

The quantity of the photoinitiators and optionally the photo-reducing agents to be applied again depends mainly on the surface to be crosslinked and on the structure of the polycarbonate molded part as well as on the intensity of the desired crosslinking reaction. The quantities of photoinitiator and optionally photo-reducing agent to be applied to the polycarbonate surface according to this latter processing variable are each in the magnitude of $10^{-3}$ g/cm$^2$ for an average 100$\mu$ surface layer to be crosslinked. The treated polycarbonate molded parts are then dried by the well-known method and modified with UV radiation.

Sources of other high-energy rays, for example, electron rays, particularly cathode rays, may also be used for irradiation of the inventive polycarbonates, optionally after adding sensitizers.

The modified polycarbonates molding compositions obtainable according to the invention are resistant towards organic solvents and, compared with conventional polycarbonates, are distinguished by an improved resistance to stress cracking. If flameproofing agents have been added, products evaluated as VO according to UL Subject 94 are obtained, even with small additions.

The modified polycarbonates obtainable according to the invention can be employed as films and shaped articles in all cases where high resistance to organic solvents coupled with high resistance to stress cracking is required.

The examples which follow are intended to illustrate the subject of the invention in more detail. The relative viscosities indicated were measured in methylene chloride at 25° C. and at a concentration of 5 g/l.

EXAMPLES

EXAMPLE 1

Polycarbonate, prepared using 3.27 mol % of methacryloyl chloride as the chain stopper.

A solution is prepared from 3.192 kg (14 mol) of 2,2-bis-(4-hydroxyphenyl)-propane (bisphenol A), 2.53 kg of 45% strength aqueous sodium hydroxide solution and 15 l of distilled water. After adding 34 kg of methylene chloride, 52.2 g (about 0.5 mol) of methacryloyl chloride, dissolved in 1 kg of methylene chloride, are added at room temperature, while stirring. 2.64 kg of phosgene are passed in at 20°–25° C. The pH value is kept at 13 to 14 during the phosgenation by adding a further 26.3 kg of 6.5% strength sodium hydroxide solution. 15 ml of triethylamine are then added and the mixture is stirred for a further 30 minutes. The upper aqueous phase is then separated off and the organic phase is acidified and washed until free from electrolytes. The methylene chloride is then evaporated off at 300° C. from the organic phase via a ZSK machine and the polycarbonate is granulated. The relative solution viscosity is about 1.30.

EXAMPLE 2

Polycarbonate, prepared using 3.4 mol % of isopropenylphenyl chlorocarbonate.

The preparation and working up are effected according to the process described in Example 1, using 3.4 mol % of isopropenylphenyl chlorocarbonate. The relative solution viscosity is about 1.31.

EXAMPLE 3

(Comparison example)

Polycarbonate, prepared using 3.27 mol % of p-tert.-butylphenol.

The preparation and working up are effected according to the process described in Example 1, using 3.27 mol % of p-tert.-butylphenol. The relative solution viscosity is about 1.30.

The polycarbonates from Examples 1 to 3 are dissolved in methylene chloride and, after adding 1 or 2% by weight of benzophenone, are processed to films about 100μ thick and dried overnight at about 120° C.

EXAMPLE 4

The polycarbonate of Example 1 is dissolved in methylene chloride and after adding 1% by weight of benzophenone, based on the weight of polycarbonate, and also 1.5% by weight of dibenzylether, based on the weight of polycarbonate is processed to a film about 100μ thick and dried overnight at about 120° C.

The films from Examples 1 to 4 are then irradiated on both sides with a Philips HTQ 4 UV lamp (high-pressure mercury vapor lamp) at a distance of 15 cm for 45 and 180 seconds. The films are treated with methylene chloride and the crosslinked portions are filtered off as insoluble fibrils or pieces of film and, after drying, are determined gravimetrically. As a result of the different crosslinking of the polycarbonates from Examples 1 to 4, the films undergo different stress cracking.

For the measurement, strips of film 1 cm wide and 100μ thick are curved to form a loop with a radius of 3 cm and the loops are immersed in carbon tetrachloride. The time until the loop of film breaks as a result of stress cracking occurring is recorded. The results are summarized in Table I.

TABLE I

| | Benzophenone content % by weight | Dibenzylether content % by weight | Exposure time seconds | Insoluble portion % | Resistance to cracking in carbon tetrachloride |
|---|---|---|---|---|---|
| Example 1 | 1 | — | 180 | 60 | >180* |
| | 2 | — | 45 | 20 | 45 |
| Example 2 | 1.5 | — | 180 | 65 | >180* |
| | 3 | — | 45 | 40 | 120 |
| Example 3 (Comparison) | 1.5 | — | 180 | — | <1 |
| | 3 | — | 45 | — | <1 |
| Example 4 | 1 | 1.5 | 45 | 30 | 60 |
| | 1 | 1.5 | 180 | 80 | >180 |

*The test was interrupted after 180 seconds.

EXAMPLE 5

3.916 g of the polycarbonate from Example 1 are mixed together with 80 g (2% by weight) of benzophenone and 4 g (0.1% by weight) of potassium perfluorobutanesulphonate at 300° C. in a twin-screw machine and the mixture is granulated.

EXAMPLE 6

3,876 g of the polycarbonate from Example 2 are mixed with 120 g of benzophenone and 4 g of potassium perfluorobutanesulphonate at 300° C. in a twin-screw machine and the mixture is granulated.

EXAMPLE 7

(Comparison example)

3,876 g of the polycarbonate from Example 3 are mixed with 120 g of benzophenone and 4 g of potassium perfluorobutanesulphonate at 300° C. in a twin-screw machine and the mixture is granulated.

The modified polycarbonates from Examples 5, 6 and 7 are injection-molded to give standard test bars and the bars are irradiated on both sides with a Philips HTQ 4 high-pressure mercury vapor lamp at a distance of about 15 cm for about 45 seconds. The fire risk classifications found are summarized in Table 2.

TABLE 2

| | UL Subject 94 | |
|---|---|---|
| | ⅛" | 1/16" |
| Example 5 | V0 | V0 |
| Example 6 | V0 | V0 |
| Example 7 (Comparison) | V2 | V2 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. High-molecular weight aromatic polycarbonates having molecular weights $\overline{M}_w$ (weight-average) between about 10,000 and 200,000 which are based on diphenols and monofunctional chain stoppers, characterized in that they correspond to the formula (I)

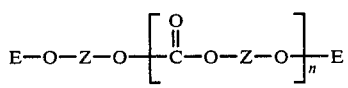

(I)

in which

Z denotes the radical of a diphenol, n denotes an integer from about 20 to 400,

E denotes

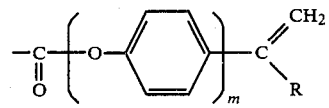

wherein m denotes 0 or 1 and

R denotes H or $C_1$-$C_3$-alkyl.

2. A process for the preparation of the polycarbonates of claim 1, characterized in that diphenols of the formula (II)

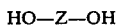

(II)

wherein

Z is a divalent aromatic radical, and/or their chlorocarbonic acid esters are reacted in accordance with the processes which are known for the preparation of polycarbonates, in a homogeneous or heterogeneous phase system, with compounds of the formula (III)

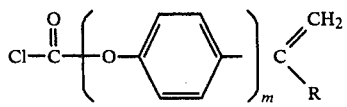 (III)

wherein
- m denotes 0 or 1 and
- R denotes H or $C_1$–$C_3$-alkyl.

3. A process for the modification of the polycarbonates of claim 1, wherein the polycarbonate is irradiated with UV light, after adding between about 0.05 and 5%, by weight, relative to the weight of polycarbonate, of a photoinitiator.

4. The process according to claim 3, wherein between about 1 and 3% by weight, relative to the weight of polycarbonate, of a photoinitiator is employed.

5. The process of claim 3, wherein the photoinitiator is added via solution and the polycarbonate is isolated as a film prior to irradiating with UV light.

6. The process of claim 3, wherein the photoinitiator is added via compounding between about 280° and 330° C. prior to irradiating with UV light.

7. The process according to claim 3, wherein between about 0.05 and 5% by weight, based on the weight of polycarbonate, of a photo-reducing agent is added to the polycarbonate prior to irradiation.

8. The process of claim 7, wherein the photo-reducing agent is added via solution and the polycarbonate is isolated as a film prior to irradiating with UV light.

9. The process of claim 7, wherein the photo-reducing agent is added via compounding between about 280° and 330° C. prior to irradiating with UV light.

10. The process of claim 7, wherein the photo-reducing agent is introduced in vapor form.

11. The process according to either claim 3 or 7, wherein between about 0.05 and 5% by weight, relative to the weight of polycarbonate, of a flameproofing agent is added to the polycarbonate prior to irradiation.

12. The process of claim 11, wherein between about 0.1 to 2% by weight, relative to the weight of polycarbonate, of a flameproofing agent is employed.

13. The process of claim 11, wherein the flameproofing agent is added via solution and the polycarbonate is isolated as a film prior to irradiating with UV light.

14. The process of claim 11, wherein the flameproofing agent is added via compounding between about 280° and 330° C. prior to irradiating with UV light.

15. A process for cross-linking the polycarbonates of claim 1, wherein the polycarbonate is dipped into a solvent mixture containing
   (a) between about 0.05 and 5% by weight, relative to the weight of polycarbonate, of a photoinitiator, and
   (b) optionally, between 0.05 and 5% by weight, based on the weight of polycarbonate, of a photo-reducing agent,
characterized in that the solvents are inert toward said polycarbonate and then irradiated with UV light.

16. The process of claim 3 wherein the polycarbonate is sprayed with a solvent mixture containing the photoinitiator and optionally a photo-reducing agent.

17. Crosslinked polycarbonates produced by the process of either claim 3 or 7.

18. The crosslinked polycarbonates of claim 17 containing between about 0.05 and 5% by weight, relative to the weight of polycarbonate, of a flameproofing agent.

* * * * *